(12) United States Patent
Kang et al.

(10) Patent No.: US 8,968,946 B2
(45) Date of Patent: Mar. 3, 2015

(54) FUEL CELL SYSTEMS

(75) Inventors: Ku-Yen Kang, Hsinchu (TW);
Chun-Ho Tai, Hsinchu (TW);
Chiou-Chu Lai, Hsinchu (TW);
Yin-Wen Tsai, Nantou County (TW);
Ying-Ying Hsu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 992 days.

(21) Appl. No.: 11/839,465

(22) Filed: Aug. 15, 2007

(65) Prior Publication Data
US 2008/0096092 A1    Apr. 24, 2008

(30) Foreign Application Priority Data
Oct. 18, 2006  (TW) ............................... 95138361 A

(51) Int. Cl.
*H01M 8/06* (2006.01)
*H01M 8/04* (2006.01)
(Continued)

(52) U.S. Cl.
CPC .... *H01M 8/0245* (2013.01); *H01M 2008/1095* (2013.01); *H01M 8/0239* (2013.01); *H01M 8/0273* (2013.01); *H01M 8/04186* (2013.01); *H01M 8/1011* (2013.01); *Y02E 60/50* (2013.01)
USPC ........... 429/414; 429/450; 429/480; 429/483; 429/517; 429/529

(58) Field of Classification Search
CPC ............ H01M 8/0239; H01M 8/0245; H01M 8/0273; H01M 8/04186; H01M 8/1011
USPC .............. 429/30, 27, 34, 408, 414, 450, 480, 429/481, 483, 508, 517, 529; 137/581
See application file for complete search history.

(56) References Cited

U.S. PATENT DOCUMENTS

| | | | | |
|---|---|---|---|---|
| 2003/0031913 A1* | 2/2003 | Pavio et al. | ...................... | 429/34 |
| 2003/0198853 A1* | 10/2003 | Choi et al. | ...................... | 429/32 |
| 2004/0062979 A1* | 4/2004 | Beckmann et al. | ............. | 429/38 |

(Continued)

FOREIGN PATENT DOCUMENTS

| | | | | |
|---|---|---|---|---|
| JP | WO2005124903 | * | 6/2005 | ............. H01M 8/10 |
| JP | 2006-004879 | | 1/2006 | |

(Continued)

OTHER PUBLICATIONS

Ma et al., IEEE Transaction on Instrumentation and Measurement, vol. 55, No. 2, Apr. 2006, p. 570-576.*

(Continued)

*Primary Examiner* — Edu E Enin-Okut

(57) ABSTRACT

A fuel cell system is provided, comprising a cell unit capable of gas exhausting. The cell unit comprises an anode current collector and a cathode current collector. A membrane electrode assembly (MEA) is interposed between the anode current collector and the cathode current collector. A frame is formed to surround the MEA, the anode current collector, and the cathode current collector. A hydrophilic gas-blocking layer is disposed adjacent to an anode side of the MEA, underlying the MEA and the frame. A hydrophobic gas-penetrating layer is disposed under the hydrophilic gas-blocking layer. At least one gas exhaust is disposed in the frame, exposing a part of the hydrophilic gas-blocking layer and contacting the area surrounding adjacent to the cell unit for exhausting a gas produced by the MEA from the cell unit.

15 Claims, 4 Drawing Sheets

(51) Int. Cl.
*H01M 8/10* (2006.01)
*H01M 8/02* (2006.01)

(56) References Cited

U.S. PATENT DOCUMENTS

| | | | |
|---|---|---|---|
| 2004/0209136 A1* | 10/2004 | Ren et al. | 429/30 |
| 2005/0208366 A1* | 9/2005 | Rohwer et al. | 429/44 |
| 2006/0057437 A1* | 3/2006 | Finkelshtain et al. | 429/12 |
| 2007/0243442 A1* | 10/2007 | Negishi et al. | 429/27 |
| 2008/0044715 A1* | 2/2008 | Vyas et al. | 429/38 |
| 2010/0159299 A1* | 6/2010 | Kang et al. | 429/30 |

FOREIGN PATENT DOCUMENTS

| | | | | |
|---|---|---|---|---|
| JP | 2006134808 A * | 5/2006 | | H01M 8/02 |
| JP | 2006269126 A * | 10/2006 | | H01M 8/02 |
| TW | 557601 | 10/2003 | | |
| TW | 557602 | 10/2003 | | |
| WO | WO 2005/112172 A1 | 11/2005 | | |
| WO | WO 2006/040961 A1 | 4/2006 | | |
| WO | WO 2006040961 A1 * | 4/2006 | | H01M 8/10 |

OTHER PUBLICATIONS

Machine translation for Monma et al., JP 2006-269126 A.*
Wayne Huang,"Application of High Thermal Conductivity Graphite Sheet on Thermal Management of PEM Fuel Cells", Dissertation,72 pages, Jun. 2006, Taiwan.

* cited by examiner

FUEL CELL SYSTEMS

BACKGROUND

The invention relates to a fuel cell system and more particularly to a fuel cell system capable of exhausting reacted gases therein.

A fuel cell is a power generating device that transforms chemical energy to electrical energy. Fuel cells emits lower or zero pollutants, are quiet, and provide higher energy density and higher energy transforming efficiency compared to conventional power generating techniques. Fuel cells are considered to be a clean energy source suitable for future applications such as portable electronic devices, household electric power generating system, transportation, military equipment, and industrial and large-scale electric power generating systems.

There are substantially five types of fuel cells each utilizing a different electrolyte. An alkaline fuel cell (AFC) utilizes potassium hydroxide as an electrolyte. A phosphoric acid fuel cell (PAFC) utilizes a phosphoric acid solution as an electrolyte. A molten carbonate fuel cell (MCFC) utilizes melted carbonic acid containing compounds as an electrolyte. A solid oxide fuel cell (SOFC) utilizes zirconium oxide as an electrolyte. A proton exchange membrane fuel cell (PEMFC), including the so-called direct methanol fuel cell (DMFC), utilizes methanol as a fuel without forming hydrogen in advance.

Because the DMFC uses liquid or gaseous methanol as a fuel supply source directly and does not require recombining of other materials such as methanol, gasoline or natural gases to form hydrogen for generation of electric power. Moreover, the DMFC generates power at a lower temperature and with a fuel composition with less danger. Thus DMFCs are suitable for application in portable electronic devices.

A conventional DMFC is mainly formed of a membrane electrode assembly (MEA), an anode current collector and a cathode current collector. The MEA comprises a proton exchange membrane, an anode catalyst layer, a cathode catalyst layer, an anode gas diffusion layer, and a cathode gas diffusion layer. The anode catalyst layer and the cathode catalyst layer are disposed on each side of the proton exchange membrane respectively. The anode gas diffusion layer and the cathode gas diffusion layer are disposed on the anode catalyst layer and the cathode catalyst layer respectively. The anode current collector and the cathode current collector are disposed over the anode gas diffusion layer and the cathode gas diffusion layer respectively. Reactions in the DMFC occur according to the following formulas (1) to (3).

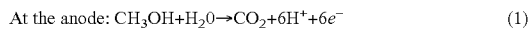

At the anode: $CH_3OH + H_2O \rightarrow CO_2 + 6H^+ + 6e^-$  (1)

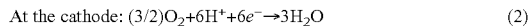

At the cathode: $(3/2)O_2 + 6H^+ + 6e^- \rightarrow 3H_2O$  (2)

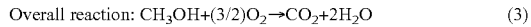

Overall reaction: $CH_3OH + (3/2)O_2 \rightarrow CO_2 + 2H_2O$  (3)

According to formula (1), $CO_2$ is generated at the anode during the DMFC operation and must be properly exhausted to prevent accumulation of gaseous pressure at the anode. The $CO_2$ is easily separated from the liquid when the anode uses liquid fuel. Separation of $CO_2$ from gaseous fuel in the fuel cell when using gaseous fuel is however difficult. Thus, gaseous fuel may be also exhausted from the fuel cell, resulting in gaseous fuel loss and affecting fuel cell conversion efficiency. An anode moisture-keeping layer maybe provided for forcing the vaporized methanol to pass through the anode moisture-keeping layer and into the anode gas diffusion layer. Moisture at the anode may, however, also pass through the anode moisture-keeping layer and diffuse into a fuel storage tank thereof, causing reduction of a fuel concentration therein, as disclosed in WO patent application 2005/112172A1. In addition, as disclosed in WO patent application 2006/040961A1, a $CO_2$ exhaust can be formed at a sidewall of a vaporized fuel reserve compartment and the vaporized methanol concentration in the vaporized fuel reserve compartment is slightly less than the fuel storage tank, thereby causing more vaporized methanol to be exhausted with the $CO_2$, polluting the environment, and reducing fuel conversion efficiency.

SUMMARY

Fuel cell systems for efficiently reducing moisture lost in the anode and ensure resistance of an MEA therein are provided. Product gases at the anode can be also efficiently exhausted reducing loss of the gaseous fuel in the system, thus improving fuel efficiency.

An exemplary embodiment of a fuel cell system comprises a cell unit capable of exhausting gas. The cell unit comprises an anode current collector and a cathode current collector. A membrane electrode assembly (MEA) is interposed between the anode current collector and the cathode current collector. A frame is formed surrounding the MEA, the anode current collector, and the cathode current collector. A hydrophilic gas-blocking layer is disposed adjacent to an anode side of the MEA, underlying the MEA and the frame. A hydrophobic gas-penetrating layer is disposed under the hydrophilic gas-blocking layer. At least one gas exhaust is disposed in the frame, exposing a part of the hydrophilic gas-blocking layer and contacting the area surrounding adjacent to the cell unit for exhausting a gas produced by the MEA from the cell unit.

Another exemplary embodiment of a fuel cell system comprises a cell unit, a fuel supply unit, and an air supply unit. The cell unit comprises an anode current collector and a cathode current collector. A membrane electrode assembly (MEA) is interposed between the anode current collector and the cathode current collector. A frame is formed to surround the MEA, the anode current collector, and the cathode current collector. A hydrophilic gas-blocking layer is disposed adjacent to an anode side of the MEA, underlying the MEA and the frame. A hydrophobic gas-penetrating layer is disposed under the hydrophilic gas-interrupting layer. At least one gas exhaust is disposed in the frame, exposing a part of the hydrophilic gas-blocking layer and contacting the area surrounding adjacent to the cell unit for exhausting a gas produced by the MEA from the cell unit. The fuel supply unit is connected to a side of the hydrophobic gas-penetrating layer adjacent to the cell unit and the air supply unit is connected to a side away from the hydrophobic gas-penetrating layer of the cell unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
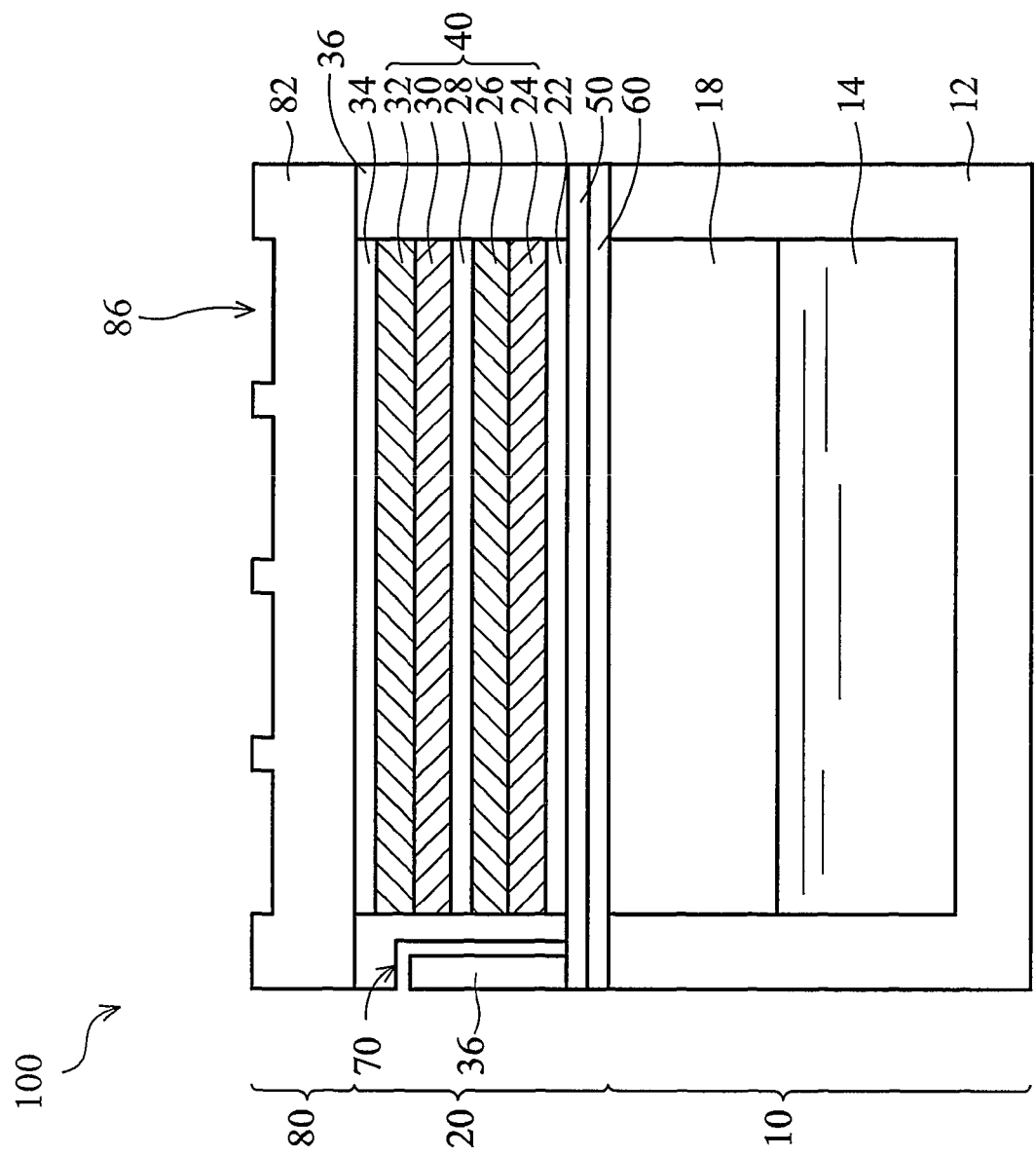
FIG. 1 is a schematic diagram showing a cross section of a fuel cell system according to an embodiment of the invention.

FIG. 1 is a schematic diagram showing a cross section of a fuel cell system 100 according to an exemplary embodiment of the invention. As shown in FIG. 1, the fuel cell system 100 comprises a cell unit 20, a fuel supply unit 10 and an air supply unit 80.

In FIG. 1, the cell unit 20 comprises an anode current collector 22, a cathode current collector 34, a membrane electrode assembly (MEA) 40 interposed between the anode current collector 22 and the cathode collector 34, and a frame 36 surrounding the MEA 40, the anode current collector 22 and the cathode collector 34. In addition, the cell unit 20 further comprises a hydrophilic gas-blocking layer 50 thereunder and a hydrophobic gas-penetrating layer 60 disposed under the hydrophilic gas-blocking layer 50. In this embodiment the MEA 40 is formed as a stacked structure comprising a plurality of sequentially stacked layers formed over the anode current collector 22, such as an anode gas diffusion layer 24, an anode catalyst layer 26, an electrolyte membrane 28, a cathode catalyst layer 30 and a cathode gas diffusion layer 32. Additionally, a gas exhaust 70 is embedded in the frame 36 and the gas exhaust 70 exposes a part of the hydrophilic gas-blocking layer 50 and connects the surrounding area adjacent to the cell unit 20. Numbers, diameters and configurations of the gas exhaust 70 are not restricted to that illustrated in FIG. 1 and can be modified according to the design requirements. The hydrophilic gas-blocking layer 50 in the cell unit 20 may comprise hydrophilic porous materials such as woven cloth, non-woven cloth, paper, foam, and PU foams, capable of absorbing moisture, thereby still providing gas-blocking performance after being wetted by moisture or liquid such as water. The diameter of the hydrophilic gas-blocking layer 50 should be as small as possible and typically should be less than twice a thickness thereof for forming a water film thereon, thus blocking penetration of $CO_2$ gases formed at the anode. Thus, the diameter of the hydrophilic gas-blocking layer 50 must be small enough or formed of non-direct penetration holes. In one embodiment, the hydrophilic gas-blocking layer 50 may have a thickness of about 100 μm and a pore size of about 0.1 μm. The hydrophobic gas-penetrating layer 60 may comprise materials durable under high-temperatures and corrosive environments and non-reactive in the fuel cell system, such as polytetrafluoroethylene (PTPE). The hydrophobic gas-penetrating layer 60 must also be capable of withstanding a water pressure of about 10 kPa or greater. In some embodiments, the hydrophobic gas-penetrating layer 60 can be a commercial product "Poreflon® Membrane FP-010-60" produced by SUMITOMO ELECTRIC FINE POLYMER INC. with a pore size of 0.1 μm capable of withstanding water pressure of about 220 kPa.

Still referring to FIG. 1, the fuel supply unit 10 is now disposed at a side adjacent to the hydrophobic gas-penetrating layer 60 of the cell unit 20 to thereby provide gaseous fuel to an anode side of the cell unit 20. The air supply unit 80 is now disposed at a side away from the hydrophobic gas-penetrating layer 60 of the cell unit 20 to thereby provide oxygen or oxygen elements in the air to a cathode of the cell unit 20. The fuel supply unit 10 here comprises a tank 12 with liquid fuel 14 and vaporized gases 18 therein, the vaporized gases 18 are directly vaporized from the liquid fuel 14. In addition, the air supply unit 80 comprises a moisture plate 82 formed with a plurality of air introducing inlets 86.

Operation of the fuel cell system 100 in FIG. 1 is described as follows. The vaporized gases of the fuel, such as vaporized methanol gases, penetrate the hydrophobic gas-penetrating layer 60 and arrive at the hydrophilic gas-blocking layer 50. Because the hydrophilic gas-blocking layer 50 is a moist membrane such as a water-wetted moist membrane, the fuel gases 18 are thus dissolved into the hydrophilic gas-blocking layer 50 again, thereby contacting the anode current collector layer 22 and the anode gas diffusion layer 24 as a liquid formation, and reacting with the anode catalyst layer 26. Oxygen gases or oxygen elements in the air can be introduced through the air inlets 86 of the air supply unit 80 and react with the cathode catalyst layer 30 after passing through the cathode current collector 34 and the cathode gas diffusion layer 32. Through the described reactions, the fuel cell system 100 generates electric power and the gases reacted at the anode, for example CO2 when using methanol as fuel, may move along an interface between the anode current collector 22 and the hydrophilic gas-blocking layer 50 and arrives the gas exhaust 70 embedded in the frame 36. Gases are thus exhausted to the surroundings of the fuel cell system 100 without diffusing into the lower compartment of the fuel supply unit 10. The fuel supply unit 10 has a higher vaporized gaseous fuel concentration and a lower ratio of gaseous fuel in the gases exhausted to the surroundings. Because a hydrophobic gas-penetrating layer 60 is disposed under the hydrophilic gas-blocking layer 50, moisture in the hydrophilic gas-blocking layer 50 will be blocked by the hydrophobic gas-penetrating layer 60 after the hydrophilic gas-blocking layer 50 is wetted. Dilution of the concentration of the liquid fuel 14 in the tank 12 is therefore avoided. Thus, by the described operation, the fuel cell system 100 is capable of maintaining resistance under certain conditions (in one embodiment, resistance increases 0% after 6 hours operation) after long term operation. The fuel cell system 100 is thus capable of serving as a non-active fuel cell system, such as a non-active direct methanol fuel cell battery, for as long as the liquid fuel 14 can be provided, and will generate electric power without issues of electricity breakdown or cell change.

Figure 2:
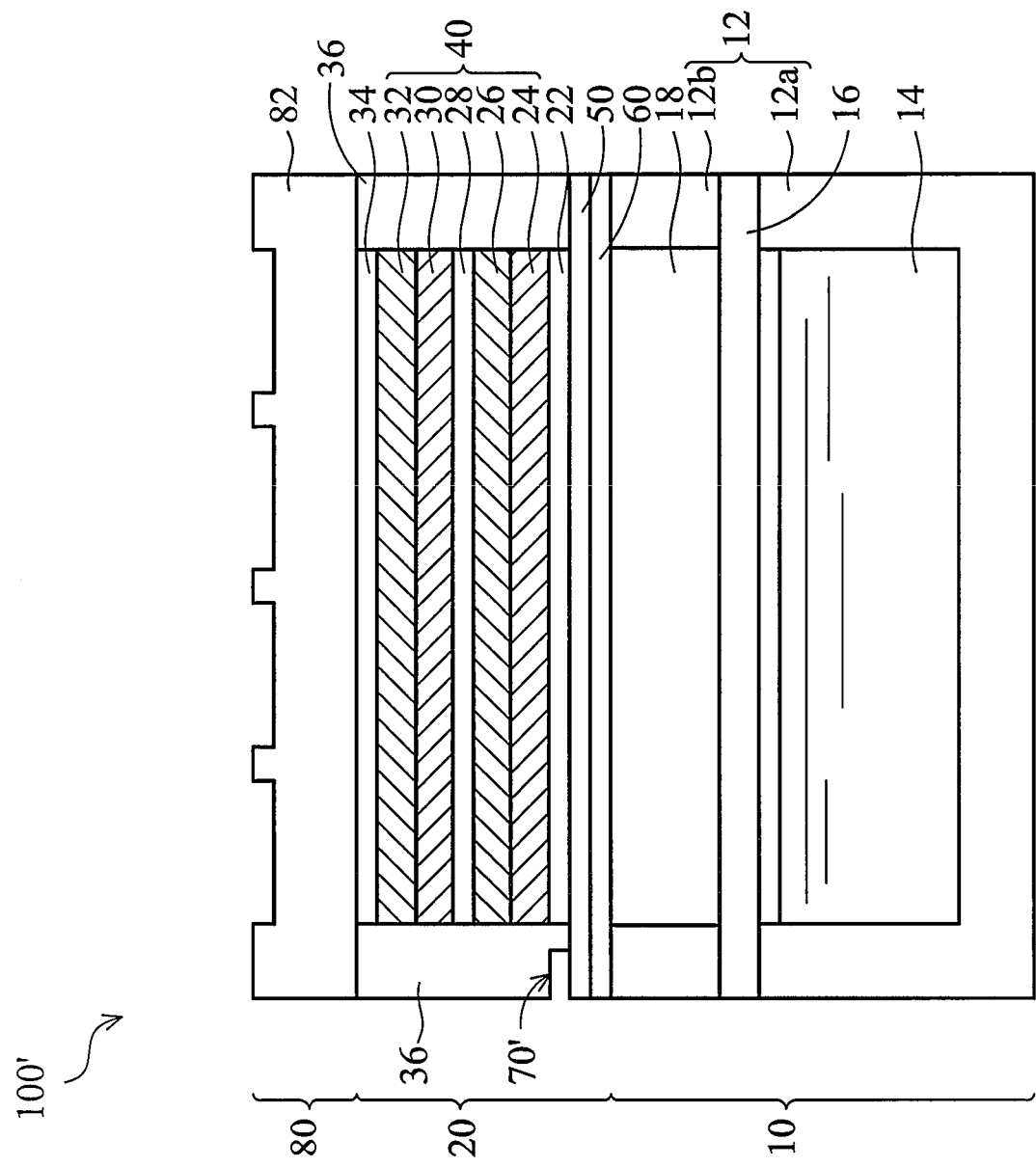
FIG. 2 is a schematic diagram showing a cross section of a fuel cell system according to another embodiment of the invention.
Figure 3:
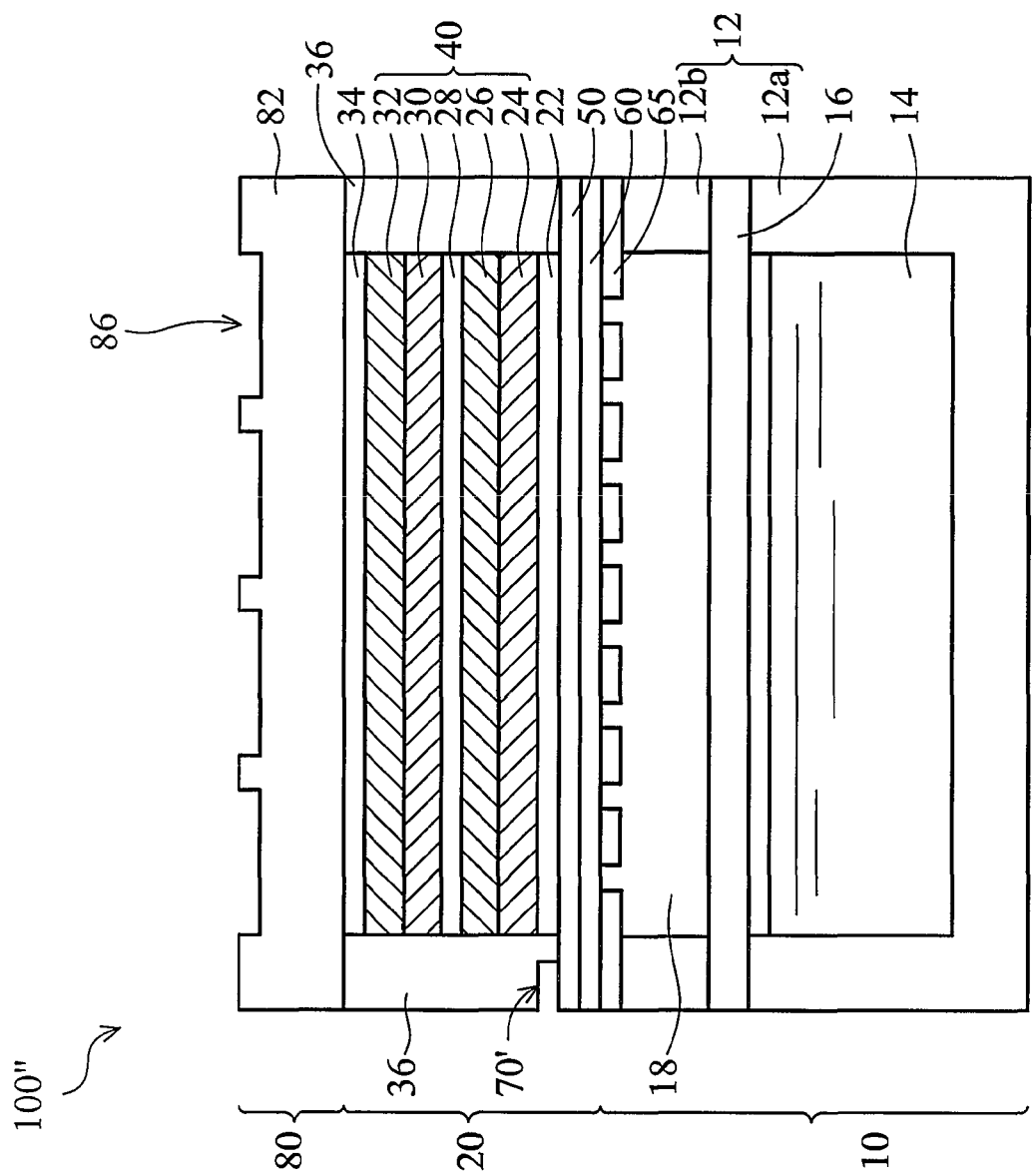
FIG. 3 is a schematic diagram showing a cross section of a fuel cell system according to yet another embodiment of the invention.

FIGS. 2 and 3 are schematic diagrams respectively showing a cross section of a fuel cell system according another exemplary embodiment of the invention. As shown in FIGS. 2 and 3, the fuel cell systems 100' and 100" are modifications of the fuel cell systems illustrated in FIG. 1. In FIGS. 2 and 3, same reference numbers represent the same components, difference between the fuel cell systems are described in the following.

FIG. 2 shows a gas-liquid separation membrane 16 optionally disposed in the fuel supply system 10 of the fuel cell system 100' for separating liquid fuel 14 and the vaporized gases 18 of the liquid fuel 14. As shown in FIG. 2, the gas-liquid separation membrane 16 is partially embedded in the tank 12, thereby defining the tank 12 into two compartments 12a and 12b. Compartment 12a of tank 12 stores the liquid fuel 14. Compartment 12b stores vaporized gases 18. Additionally, a gas exhaust 70' of a modified configuration is disposed in the frame 36 of the cell unit 12. The gas exhaust 70' is disposed at an edge of the frame 36 and the hydrophilic gas-blocking layer 50 and extends horizontally in the frame 36. A multi-hole plate 65 can be optionally disposed between a top surface of the fuel cell supply unit 10 and the cell unit 20 to control transportation of the vaporized fuel gases and function as a support structure of the cell unit 20 and the gas supply unit 80. The multi-hole plate 65 has a porosity of about 0.1~20% and the porosity therein is decided according to the electrical currents of the MEA. The multi-hole plate 65 may comprise materials are that are gas-blocking, corrosive resistant and chemically inert, such as polyesters or polyolefin. In some embodiments, the multi-hole plate 65 may comprise materials such as polyethylene terephthalate (PET), polyacrylonitrile (PAN), polyethylene (PE), or polypropylene (PP).

Figure 4:
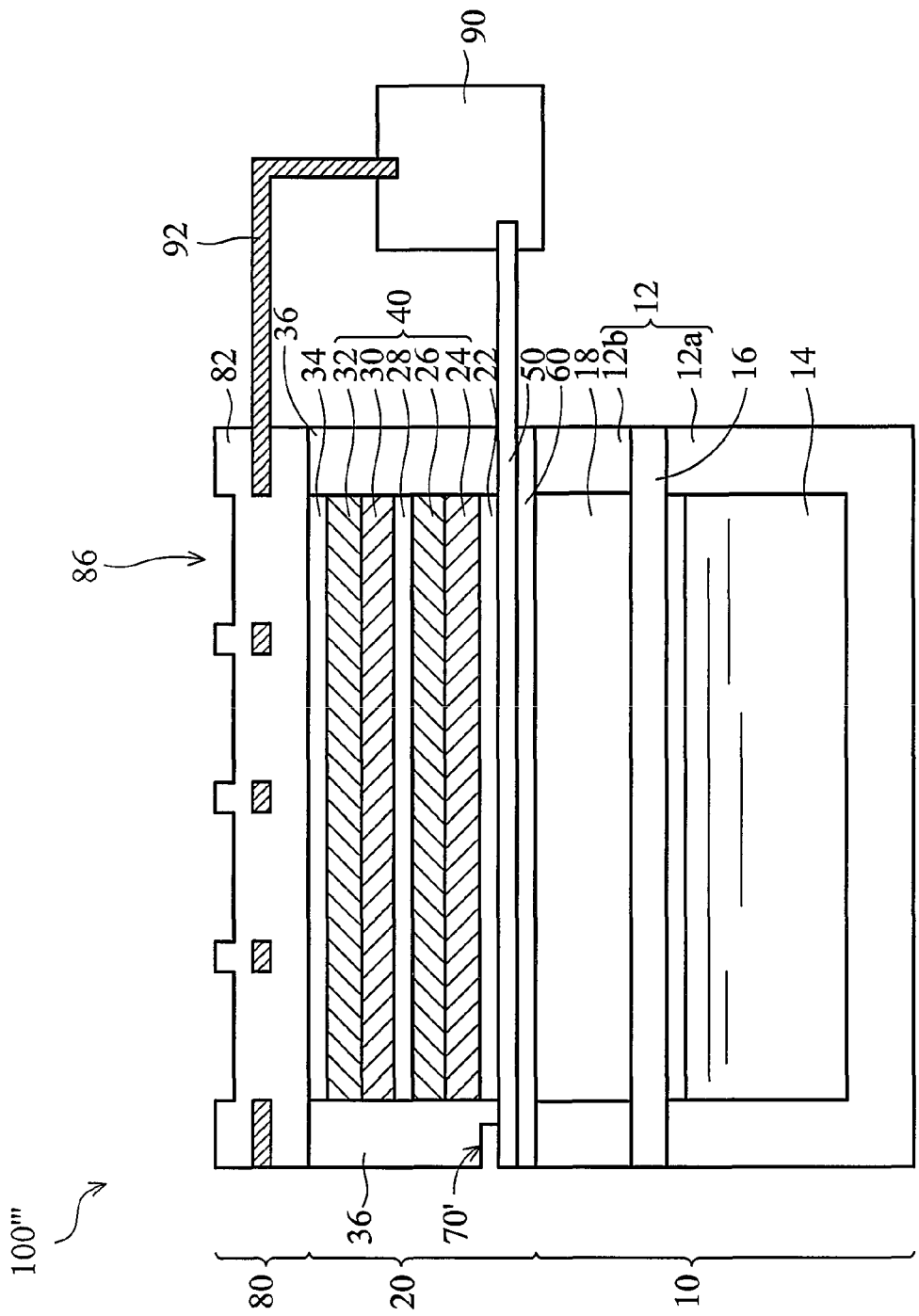
FIG. 4 is a schematic diagram showing a cross section of a fuel cell system according to still yet another embodiment of the invention.

FIG. 4 is a schematic diagram showing a cross section of an embodiment of a fuel cell system 100''' modified from that illustrated in FIG. 2. In FIG. 4, the same reference numbers represent the same components illustrated in FIG. 2 and differences are described in the following.

FIG. 4 shows that a liquid storage tank 90 can be further provided in the fuel cell system 100'''. The liquid storage tank 90 is structurally independent from the fuel supply system 10 and the cell unit 20. A water collector layer 92 can further be embedded in the moisture-keeping plate 82 of the air supply unit 80. The water collector layer 92 may comprise porous and hydrophilic porous materials such as woven cloths, non-woven cloths, paper, foam, and PU foam, and are physically connected with the liquid storage tank 90. Additionally, as shown in FIG. 4, the hydrophilic gas-blocking layer 50 protrudes over a side of the frame 36 and is partially embedded in the liquid storage tank 90. An amount of liquid such as water can thus be manually introduced to the liquid storage tank 90, or condensed moisture can reflow back to the liquid storage tank 90 through the water collector layer 92 partially embedded in the liquid storage tank 90. Moisture can thus be supplied to the hydrophilic gas-blocking layer 50 disposed between the MEA 40 and the hydrophobic gas-penetrating layer 60. The amount of reflowed water will thus not be affected by environmental conditions and will not cause water-loss issues in the hydrophilic gas-blocking layer 50. Operating life and performance of the fuel cell unit 100''' can thus be improved. The water supply system illustrated in FIG. 4 can be also adopted in the fuel cell system in FIGS. 1 and 3 and is not restricted to that disclosed in FIG. 4.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fuel cell system, comprising:
 a cell unit, comprising:
  an anode current collector;
  a cathode current collector;
  a membrane electrode assembly (MEA) interposed between the anode current collector and the cathode current collector;
  a frame surrounding the MEA, the anode current collector, and the cathode current collector;
  a hydrophilic gas-blocking layer disposed adjacent to an anode side of the MEA, wherein the hydrophilic gas-blocking layer is a moist membrane for blocking a gas produced by the MEA from penetrating there through, and the hydrophilic gas-blocking layer physically contacts the anode current collector;
  a hydrophobic gas-penetrating layer, wherein the hydrophilic gas-blocking layer is located between the hydrophobic gas-penetrating layer and the anode current collector, and the hydrophobic gas-penetrating layer physically contacts the hydrophilic gas-blocking layer; and
 a gas exhaust embedded in the frame, wherein the gas exhaust exposes a part of the hydrophilic gas-blocking layer and contacts the area surrounding the cell unit;
 wherein a material of the hydrophilic gas-blocking layer is selected such that, when wetted, a fuel gas contacting the hydrophilic gas-blocking layer via the hydrophobic gas-penetrating layer is dissolved into the hydrophilic gas-blocking layer, and the hydrophilic gas-blocking layer is arranged such that the fuel gas dissolved therein contacts the anode current collection layer in a liquid form.

2. The fuel cell system as claimed in claim 1, further comprising a fuel supply unit connected to a side of the hydrophobic gas-penetrating layer of the cell unit.

3. The fuel cell system as claimed in claim 1, further comprising an air supply unit connected to a side away from the hydrophobic gas-penetrating layer of the cell unit.

4. The fuel cell system as claimed in claim 1, wherein the MEA is a stacked structure comprising an anode gas diffusion layer, an anode catalyst layer, an electrolyte membrane, a cathode catalyst layer and a cathode gas diffusion layer which are sequentially stacked.

5. The fuel cell system as claimed in claim 2, wherein the fuel supply unit comprises a liquid fuel and a vaporized gas of the liquid fuel.

6. The fuel cell system as claimed in claim 5, the vaporized gas of the liquid fuel is directly vaporized from the liquid fuel.

7. The fuel cell system as claimed in claim 1, wherein the hydrophilic gas-blocking layer comprises hydrophilic porous materials selected from the group consisting of woven cloth, non-woven cloth, paper, foam, and PU foams.

8. The fuel cell system as claimed in claim 1, wherein the hydrophilic gas-blocking layer has porosities less than twice of a thickness of hydrophilic gas-blocking layer.

9. The fuel cell system as claimed in claim 6, wherein the hydrophobic gas-penetrating layer blocks moisture from leaving the cell unit and controls a flow rate of the vaporized gas of the liquid fuel into the cell unit.

10. The fuel cell system as claimed in claim 9, wherein the hydrophobic gas-penetrating layer comprises polytetrafluoroethylene.

11. The fuel cell system as claimed in claim 10, wherein the hydrophobic gas-penetrating layer has a waterproof pressure of more than 10 kPa.

12. The fuel cell system as claimed in claim 5, further comprising a gas-liquid separation membrane disposed in the fuel supply unit to thereby separate the liquid fuel and the vaporized gases of the liquid fuel.

13. The fuel cell system as claimed in claim 2, further comprising a multi-hole plate disposed between a top surface of the fuel supply unit and the cell unit.

14. The fuel cell system as claimed in claim 13, wherein the multi-hole plate has a porosity of about 0.1~20%.

15. The fuel cell system as claimed in claim 1, further comprising a fuel supply unit arranged to provide the fuel gas to the hydrophobic gas-penetrating layer, wherein the fuel gas is a vaporized gas of a liquid fuel.

* * * * *